(12) United States Patent
Yamamoto et al.

(10) Patent No.: US 11,602,703 B2
(45) Date of Patent: Mar. 14, 2023

(54) DEGASIFICATION SYSTEM, LIQUID DEGASIFICATION METHOD, DEGASIFICATION MODULE, METHOD FOR MANUFACTURING DEGASIFICATION SYSTEM, AND METHOD FOR PRODUCING NATURAL RESOURCES

(71) Applicant: DIC Corporation, Tokyo (JP)

(72) Inventors: Wataru Yamamoto, Ichihara (JP); Katsuhiko Igari, Ichihara (JP); Kenji Sano, Ichihara (JP); Kazumi Oi, Ichihara (JP)

(73) Assignee: DIC Corporation, Tokyo (JP)

( * ) Notice: Subject to any disclaimer, the term of this patent is extended or adjusted under 35 U.S.C. 154(b) by 187 days.

(21) Appl. No.: 17/277,501

(22) PCT Filed: Sep. 27, 2019

(86) PCT No.: PCT/JP2019/038373
§ 371 (c)(1),
(2) Date: Mar. 18, 2021

(87) PCT Pub. No.: WO2020/067512
PCT Pub. Date: Apr. 2, 2020

(65) Prior Publication Data
US 2022/0023774 A1    Jan. 27, 2022

(30) Foreign Application Priority Data

Sep. 27, 2018    (JP) .............................. JP2018-182342

(51) Int. Cl.
*B01D 53/22* (2006.01)
*B01D 19/00* (2006.01)
(Continued)

(52) U.S. Cl.
CPC ....... *B01D 19/0031* (2013.01); *B01D 63/021* (2013.01); *B01D 63/043* (2013.01);
(Continued)

(58) Field of Classification Search
CPC ............ B01D 2221/04; B01D 2325/36; B01D 63/043; B01D 19/0031; B01D 63/021;
(Continued)

(56) References Cited

U.S. PATENT DOCUMENTS

| | | | | |
|---|---|---|---|---|
| 5,529,701 A | * | 6/1996 | Grisham | .................... B04C 9/00 96/216 |
| 5,662,811 A | * | 9/1997 | Grisham | .................... B04C 7/00 210/221.2 |
| 6,149,817 A | | 11/2000 | Peterson et al. | |
| 2009/0002650 A1 | * | 1/2009 | Nomoto | .................. G03B 27/42 355/53 |
| 2009/0084725 A1 | * | 4/2009 | Poklop | .................... B01D 69/04 210/439 |

(Continued)

FOREIGN PATENT DOCUMENTS

| CN | 2342863 Y | 10/1999 |
|---|---|---|
| CN | 102510769 A | 6/2012 |

(Continued)

OTHER PUBLICATIONS

Engineers Edge "Pressure Drop", 1 page, 2000 https://www.engineersedge.com/fluid_flow/pressure_drop/pressure_drop.htm (Year: 2000).*

*Primary Examiner* — Anthony R Shumate
(74) *Attorney, Agent, or Firm* — Locke Lord LLP

(57) ABSTRACT

A degasification system includes a degasification unit in which a plurality of degasification modules degasifying a liquid are connected, wherein the degasification unit has a connection supply pipe which connects the liquid supply paths of the plurality of degasification modules in series and (Continued)

in which openings through which the liquid passes are formed at positions corresponding to the plurality of degasification modules such that the liquid is supplied to the hollow fiber membrane bundles of the plurality of degasification modules in parallel, and wherein the degasification unit is configured such that a pressure loss of the liquid from a supply port of the connection supply pipe through which the liquid is supplied to the discharge ports of a downstream side degasification module is larger than a pressure loss of the liquid from the supply port to the discharge ports of an upstream side degasification module.

25 Claims, 8 Drawing Sheets

(51) Int. Cl.
  *B01D 63/02*   (2006.01)
  *B01D 63/04*   (2006.01)
(52) U.S. Cl.
  CPC ...... *B01D 2221/04* (2013.01); *B01D 2313/10* (2013.01); *B01D 2313/12* (2013.01); *B01D 2319/02* (2013.01); *B01D 2325/36* (2013.01)
(58) Field of Classification Search
  CPC ............ B01D 2313/12; B01D 2319/02; B01D 2313/10
  See application file for complete search history.

(56) References Cited

U.S. PATENT DOCUMENTS

| | | | |
|---|---|---|---|
| 2009/0156875 A1* | 6/2009 | Tomioka | B01D 53/1487 96/5 |
| 2010/0155334 A1* | 6/2010 | Taniguchi | B01D 63/022 264/261 |
| 2010/0230366 A1 | 9/2010 | Bigeonneau et al. | |
| 2011/0036240 A1 | 2/2011 | Taylor et al. | |
| 2011/0079548 A1* | 4/2011 | Nejigaki | B01D 65/02 210/172.3 |
| 2016/0158670 A1 | 6/2016 | Tanizaki et al. | |
| 2016/0207003 A1* | 7/2016 | Nishioka | B01D 63/12 |
| 2018/0148680 A1* | 5/2018 | Sasayama | C12M 3/02 |
| 2019/0151801 A1* | 5/2019 | Suganuma | B01D 63/023 |
| 2019/0168135 A1* | 6/2019 | Tanizaki | B01D 19/00 |
| 2022/0062794 A1* | 3/2022 | Yamamoto | B01D 19/0031 |
| 2022/0250393 A1* | 8/2022 | Suzuki | B41J 2/175 |

FOREIGN PATENT DOCUMENTS

| | | |
|---|---|---|
| CN | 204170628 U | 2/2015 |
| CN | 105517693 A | 4/2016 |
| JP | H06-134210 A | 5/1994 |
| JP | H07-178322 A | 7/1995 |
| JP | 4593719 B2 | 12/2010 |
| JP | 2013-502315 A | 1/2013 |
| KR | 10-2015-0091891 A | 8/2015 |
| WO | 2015/012293 A1 | 1/2015 |

* cited by examiner

Fig.7

|  | TOTAL FLOW RATE ($m^3/h$) | |
|---|---|---|
|  | 4 | 24 |
| FOURTH DEGASIFICATION MODULE FLOW RATE ($m^3/h$) | 1.02 | 6.50 |
| THIRD DEGASIFICATION MODULE FLOW RATE ($m^3/h$) | 1.01 | 6.24 |
| SECOND DEGASIFICATION MODULE FLOW RATE ($m^3/h$) | 0.99 | 5.86 |
| FIRST DEGASIFICATION MODULE FLOW RATE ($m^3/h$) | 0.98 | 5.39 |
| DEVIATION RATE | ±2% | ±10% |

DEGASIFICATION SYSTEM, LIQUID DEGASIFICATION METHOD, DEGASIFICATION MODULE, METHOD FOR MANUFACTURING DEGASIFICATION SYSTEM, AND METHOD FOR PRODUCING NATURAL RESOURCES

TECHNICAL FIELD

An aspect of the present invention relates to a degasification system including a degasification unit in which a plurality of degasification modules are connected, a liquid degasification method using the degasification system, a degasification module used in the degasification system, a method for manufacturing the degasification system, and a method for producing natural resources.

BACKGROUND ART

In the related art, a degasification module that degasifies a liquid using hollow fiber membranes is known. Further, a degasification system in which a plurality of degasification modules are connected to cope with an increase in size or flow rate is also known.

Patent Literature 1 discloses an assembly in which a plurality of fluid contactors each including hollow fiber membranes are connected. In this assembly, for the plurality of fluid contactors, the same fluid contactors are used. Further, in this assembly, an inlet manifold for supplying a liquid is individually connected to the plurality of fluid contactors by branching to correspond to the plurality of fluid contactors. Therefore, the liquid supplied to the inlet manifold is supplied to the plurality of fluid contactors in parallel.

CITATION LIST

Patent Literature

[Patent Literature 1] Japanese Patent No. 4593719

SUMMARY OF INVENTION

Technical Problem

Incidentally, it was believed that the degasification performance was the same between a case in which a liquid flows through one degasification module and a case in which N times as much liquid flows through a degasification system in which N degasification modules are connected. However, as a result of research by the present inventors, it has been found that, in a case where, as a degasification system, a system in which liquid supply paths of a plurality of degasification modules are connected in series, and the liquid is supplied to the hollow fiber membranes of the plurality of degasification modules in parallel, is used, the degasification performance is lower than that of a case where the liquid flows through one degasification module.

Therefore, an object of the aspect of the present invention is to provide a degasification system capable of improving the overall degasification performance, a liquid degasification method using the degasification system, a degasification module used in the degasification system, a method for manufacturing the degasification system, and a method for producing natural resources.

Solution to Problem

The present inventors have further researched to achieve the above object and have obtained the following findings.

In a degasification system in which a plurality of degasification modules are connected, it was believed that the same amount of liquid flowed through each degasification module. However, in practice, in a degasification system in which liquid supply paths of a plurality of degasification modules are connected in series, and the liquid is supplied to the hollow fiber membranes of the plurality of degasification modules in parallel, the flow rate of the liquid flowing through each degasification module is different between the upstream side and the downstream side. This is considered to be due to the following reasons.

That is, in such a degasification system, the liquid flows out from the liquid supply path to the hollow fiber side, and thus the flow velocity of the liquid decreases from the upstream side toward the downstream side. Thus, the pressure of the liquid increases from the upstream side toward the downstream side. Therefore, the flow rate of the liquid flowing through the degasification modules increases toward the downstream side, and the flow rate of the liquid flowing through the degasification modules decreases toward the upstream side. Since the degasification performance of the degasification module varies greatly depending on the flow rate of the liquid, it is thought that the degasification performance of the degasification system in its entirety deteriorates when a deviation in the flow rate of the liquid occurs between a degasification module on the upstream side and a degasification module on the downstream side.

From the above, it has been concluded that it is possible to improve the degasification performance of the degasification system in its entirety by reducing the deviation in the flow rate of the liquid between a degasification module on the upstream side and a degasification module on the downstream side.

A degasification system according to an aspect of the present invention includes a degasification unit in which a plurality of degasification modules degasifying a liquid are connected, wherein each of the plurality of degasification modules has a hollow fiber membrane bundle having a plurality of hollow fiber membranes arranged around a liquid supply path through which a liquid is supplied, and a module container which houses the hollow fiber membrane bundle and in which discharge ports for discharging the liquid are formed, wherein the degasification unit has a connection supply pipe which connects the liquid supply paths of the plurality of degasification modules in series and in which openings through which the liquid passes are formed at positions corresponding to the plurality of degasification modules such that the liquid is supplied to the hollow fiber membrane bundles of the plurality of degasification modules in parallel, wherein the plurality of degasification modules include an upstream side degasification module and a downstream side degasification module disposed on a downstream side of the upstream side degasification module, and wherein the degasification unit is configured such that a pressure loss of the liquid from a supply port of the connection supply pipe through which the liquid is supplied to the discharge ports of the downstream side degasification module is larger than a pressure loss of the liquid from the supply port to the discharge ports of the upstream side degasification module.

In the degasification system, the liquid is supplied to the hollow fiber membrane bundles of the plurality of degasification modules in parallel by the connection supply pipe that connects the liquid supply paths of the plurality of degasification modules in series. However, the pressure loss of the liquid from the supply port of the connection supply pipe to the discharge ports of the downstream side degasification module is larger than the pressure loss of the liquid from the supply port of the connection supply pipe to the discharge ports of the upstream side degasification module. Therefore, this difference in pressure loss acts to offset the difference in flow velocity and pressure in the flow direction of the liquid. As a result, the deviation in the flow rate of the liquid between the upstream side degasification module and the downstream side degasification module is reduced, and thus it is possible to improve the degasification performance of the degasification system in its entirety.

The degasification unit may be configured such that a pressure loss of the liquid from the openings formed at a position corresponding to the downstream side degasification module to the discharge ports of the downstream side degasification module is larger than a pressure loss of the liquid from the openings formed at a position corresponding to the upstream side degasification module to the discharge ports of the upstream side degasification module. By making the pressure loss of the liquid from the openings formed at a position corresponding to the downstream side degasification module to the discharge ports of the module container larger than the pressure loss of the liquid from the openings formed at a position corresponding to the upstream side degasification module to the discharge ports of the module container, it becomes more difficult for the liquid to flow in the downstream side degasification module than in the upstream side degasification module.

Accordingly, the degasification performance of the degasification system in its entirety can be improved.

The connection supply pipe may be configured such that a pressure loss of the liquid at a position corresponding to the downstream side degasification module is larger than a pressure loss of the liquid at a position corresponding to the upstream side degasification module. By making the pressure loss of the liquid of the connection supply pipe at a position corresponding to the downstream side degasification module larger than the pressure loss of the liquid of the connection supply pipe at a position corresponding to the upstream side degasification module, it is possible to make the pressure loss of the liquid from the supply port of the connection supply pipe to the discharge ports of the downstream side degasification module larger than the pressure loss of the liquid from the supply port of the connection supply pipe to the discharge ports of the upstream side degasification module. Accordingly, the degasification performance of the degasification system in its entirety can be improved.

An inner diameter of the connection supply pipe at a position corresponding to the downstream side degasification module may be smaller than an inner diameter of the connection supply pipe at a position corresponding to the upstream side degasification module. Thereby, the pressure loss of the liquid of the connection supply pipe at a position corresponding to the downstream side degasification module is larger than the pressure loss of the liquid of the connection supply pipe at a position corresponding to the upstream side degasification module, and thus it is possible to improve the degasification performance of the degasification system in its entirety.

The openings formed at a position corresponding to the downstream side degasification module may be configured such that a pressure loss of the liquid in the openings formed at a position corresponding to the downstream side degasification module is larger than that in the openings formed at a position corresponding to the upstream side degasification module. By making the pressure loss of the liquid in the openings formed at a position corresponding to the downstream side degasification module larger than the pressure loss of the liquid in the openings formed at a position corresponding to the upstream side degasification module, it is possible to make the pressure loss of the liquid from the supply port of the connection supply pipe to the discharge ports of the downstream side degasification module larger than the pressure loss of the liquid from the supply port of the connection supply pipe to the discharge ports of the upstream side degasification module.

A total area of the openings formed at a position corresponding to the downstream side degasification module may be smaller than a total area of the openings formed at a position corresponding to the upstream side degasification module. Further, the number of the openings formed at a position corresponding to the downstream side degasification module may be smaller than the number of the openings formed at a position corresponding to the upstream side degasification module. Further, a size of each of the openings formed at a position corresponding to the downstream side degasification module may be smaller than a size of each of the openings formed at a position corresponding to the upstream side degasification module. Thereby, the pressure loss of the liquid in the openings formed at a position corresponding to the downstream side degasification module is larger than the pressure loss of the liquid in the openings formed at a position corresponding to the upstream side degasification module, and thus it is possible to improve the degasification performance of the degasification system in its entirety.

Each of the plurality of degasification modules may further have a module inner pipe around which the hollow fiber membrane bundle is disposed and in which inner pipe openings through which the liquid passes are formed, and the inner pipe openings of the downstream side degasification module may be configured such that a pressure loss of the liquid in the inner pipe openings of the downstream side degasification module is larger than that in the inner pipe openings of the upstream side degasification module. In a case in which each of the plurality of degasification modules has the module inner pipe, by making the pressure loss of the liquid in the inner pipe openings of the downstream side degasification module larger than the pressure loss of the liquid in the inner pipe openings of the upstream side degasification module, it is possible to make the pressure loss of the liquid from the supply port of the connection supply pipe to the discharge ports of the downstream side degasification module larger than the pressure loss of the liquid from the supply port of the connection supply pipe to the discharge ports of the upstream side degasification module.

The hollow fiber membrane bundle of the downstream side degasification module may be configured such that a pressure loss of the liquid in the hollow fiber membrane bundle of the downstream side degasification module is larger than that in the hollow fiber membrane bundle of the upstream side degasification module. By making the pressure loss of the liquid in the hollow fiber membrane bundle of the downstream side degasification module larger than the pressure loss of the liquid in the hollow fiber membrane bundle of the upstream side degasification module, it is possible to make the pressure loss of the liquid from the supply port of the connection supply pipe to the discharge ports of the downstream side degasification module larger than the pressure loss of the liquid from the supply port of the connection supply pipe to the discharge ports of the upstream side degasification module. Accordingly, the degasification performance of the degasification system in its entirety can be improved.

A density of the plurality of hollow fiber membranes in the downstream side degasification module may be higher than a density of the plurality of hollow fiber membranes in the upstream side degasification module. Further, a thickness of the hollow fiber membrane bundle in the downstream side degasification module may be thicker than a thickness of the hollow fiber membrane bundle in the upstream side degasification module. Further, the hollow fiber membrane bundle may be formed by a woven fabric obtained by weaving the plurality of hollow fiber membranes, which are weft threads, with warp threads being wound around the liquid supply path, and a winding pressure of the woven fabric in the downstream side degasification module may be higher than a winding pressure of the woven fabric in the upstream side degasification module. Further, the hollow fiber membrane bundle may be formed by a woven fabric obtained by weaving the plurality of hollow fiber membranes, which are weft threads, with warp threads being wound around the liquid supply path such that the plurality of hollow fiber membranes extend in an axial direction of the liquid supply path, and a pitch between the warp threads in the downstream side degasification module may be longer than a pitch between the warp threads in the upstream side degasification module. Further, an outer diameter of the hollow fiber membrane in the downstream side degasification module may be larger than an outer diameter of the hollow fiber membrane in the upstream side degasification module. Further, the hollow fiber membrane in the downstream side degasification module may have a higher hydrophilicity than the hollow fiber membrane in the upstream side degasification module. Thereby, the pressure loss of the liquid in the hollow fiber membrane bundle of the downstream side degasification module is larger than the pressure loss of the liquid in the hollow fiber membrane bundle of the upstream side degasification module, and thus it is possible to improve the degasification performance of the degasification system in its entirety.

The discharge ports of the module container of the downstream side degasification module may be configured such that a pressure loss of the liquid in the discharge ports of the module container of the downstream side degasification module is larger than that in the discharge ports of the module container of the upstream side degasification module. By making the pressure loss of the liquid in the discharge ports of the downstream side degasification module larger than the pressure loss of the liquid in the discharge ports of the upstream side degasification module, it is possible to make the pressure loss of the liquid from the supply port of the connection supply pipe to the discharge ports of the downstream side degasification module larger than the pressure loss of the liquid from the supply port of the connection supply pipe to the discharge ports of the upstream side degasification module. Accordingly, the degasification performance of the degasification system in its entirety can be improved.

A total area of the discharge ports of the downstream side degasification module may be smaller than a total area of the discharge ports of the upstream side degasification module. Further, the number of the discharge ports of the downstream side degasification module may be smaller than the number of the discharge ports of the upstream side degasification module. Further, a size of each of the discharge ports of the downstream side degasification module may be smaller than a size of each of the discharge ports of the upstream side degasification module. Thereby, the pressure loss of the liquid in the discharge ports of the downstream side degasification module is larger than the pressure loss of the liquid in the discharge ports of the upstream side degasification module, and thus it is possible to improve the degasification performance of the degasification system in its entirety.

The degasification system according to the aspect of the present invention further includes a housing which houses the degasification unit and in which an inlet through which a liquid is supplied from outside and an outlet through which a liquid is discharged to the outside are formed; and a suction pipe communicating with an inside of the plurality of hollow fiber membranes of each of the plurality of degasification modules to suction the inside of the plurality of the hollow fiber membranes. By providing such a housing and a suction pipe, it is possible to appropriately degasify the liquid in the degasification unit, and it is possible to appropriately recover the liquid degasified in the degasification unit.

A liquid degasification method according to an aspect of the present invention in any one of the above degasification systems includes degasifying a liquid by supplying the liquid from the connection supply pipe to the liquid supply paths of the plurality of degasification modules and depressurizing an inside of the plurality of hollow fiber membranes of each of the plurality of degasification modules.

A degasification module according to an aspect of the present invention used in any of the above degasification systems includes a hollow fiber membrane bundle having a plurality of hollow fiber membranes arranged around a liquid supply path through which a liquid is supplied; and a module container which houses the hollow fiber membrane bundle and in which discharge ports for discharging the liquid are formed.

A method for manufacturing a degasification system according to an aspect of the present invention includes preparing a plurality of degasification modules each having a hollow fiber membrane bundle having a plurality of hollow fiber membranes arranged around a liquid supply path through which a liquid is supplied and a module container which houses the hollow fiber membrane bundle and in which discharge ports for discharging the liquid are formed, and a connection supply pipe in which a plurality of openings through which the liquid passes are formed; inserting the connection supply pipe into the liquid supply paths of the plurality of degasification modules to connect the liquid supply paths of the plurality of degasification modules in series by the connection supply pipe and disposing the plurality of openings at positions corresponding to the plurality of degasification modules such that the liquid is supplied to the hollow fiber membrane bundles of the plurality of degasification modules in parallel; and in a case in which one of the plurality of degasification modules is designated as an upstream side degasification module, and one of the plurality of degasification modules disposed on a downstream side of the upstream side degasification module is designated as a downstream side degasification module, making a pressure loss of the liquid from a supply port of the connection supply pipe through which the liquid is supplied to the discharge ports of the downstream side degasification module larger than a pressure loss of the liquid from the supply port to the discharge ports of the upstream side degasification module.

A method for producing natural resources according to an aspect of the present invention in any of the above degasification systems includes a degasification step of degasifying a liquid by supplying the liquid from the connection supply pipe to the liquid supply paths of the plurality of degasification modules and depressurizing an inside of the plurality of hollow fiber membranes of each of the plurality of degasification modules, and a press-in step of pressing-in the liquid degasified in the degasification step into a natural resource mining site.

Advantageous Effects of Invention

According to the aspect of the present invention, the degasification performance of the degasification system in its entirety can be improved.

BRIEF DESCRIPTION OF DRAWINGS

FIG. 7 is a table showing an example of a flow rate of a liquid flowing through each degasification module in a degasification system of a reference example.

DESCRIPTION OF EMBODIMENTS

Hereinafter, in the description based on the drawings, the same elements or similar elements having the same functions are designated by the same reference sign lists, and duplicate descriptions will be omitted.

Figure 1:
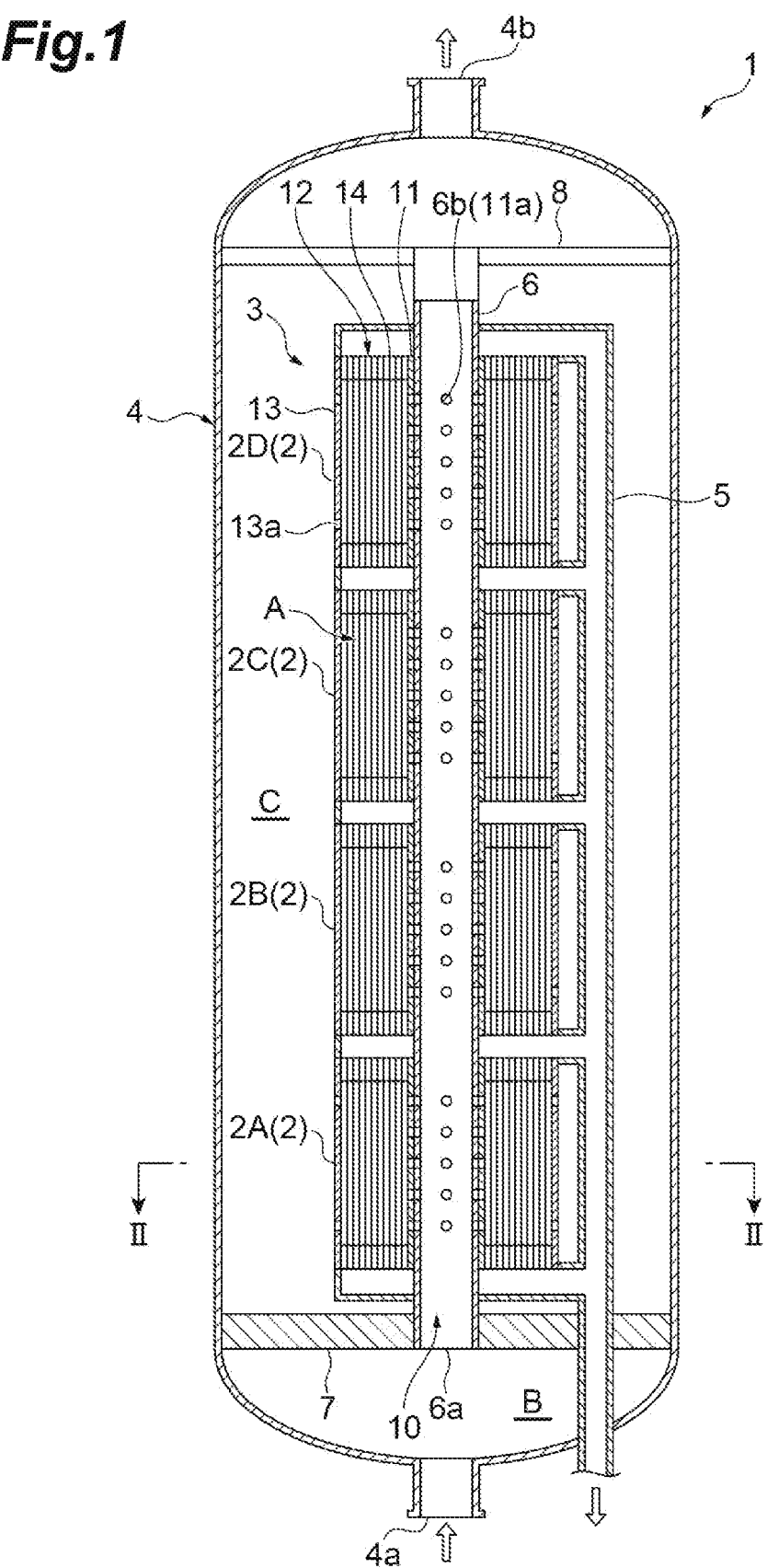
FIG. 1 is a schematic cross-sectional view of a degasification system according to an embodiment.
Figure 2:
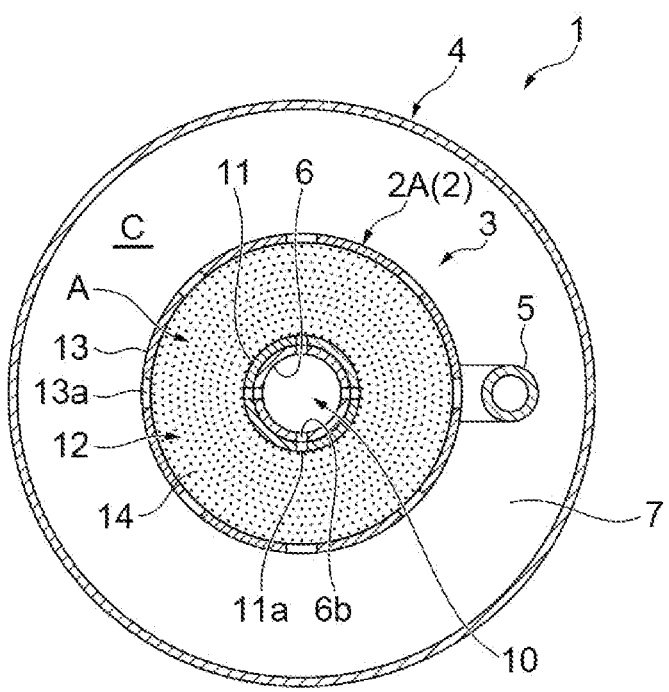
FIG. 2 is a schematic cross-sectional view along line II-II shown in FIG. 1.
Figure 3:
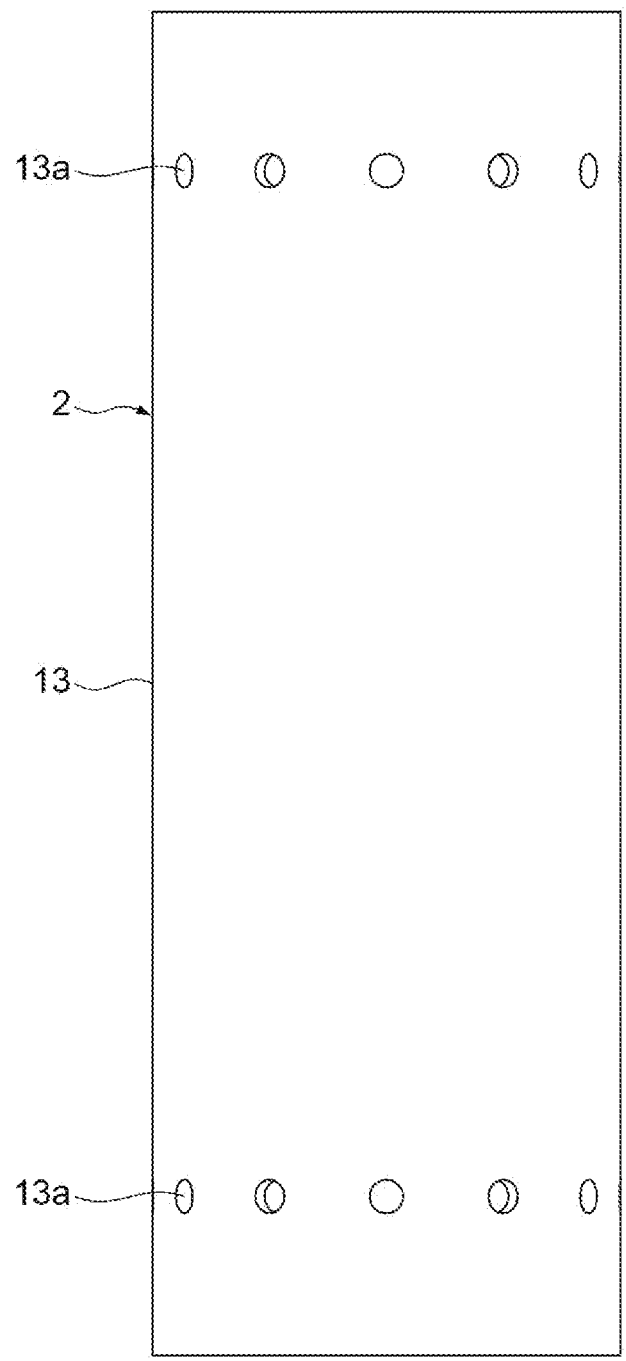
FIG. 3 is a schematic front view of a degasification module.
Figure 4:
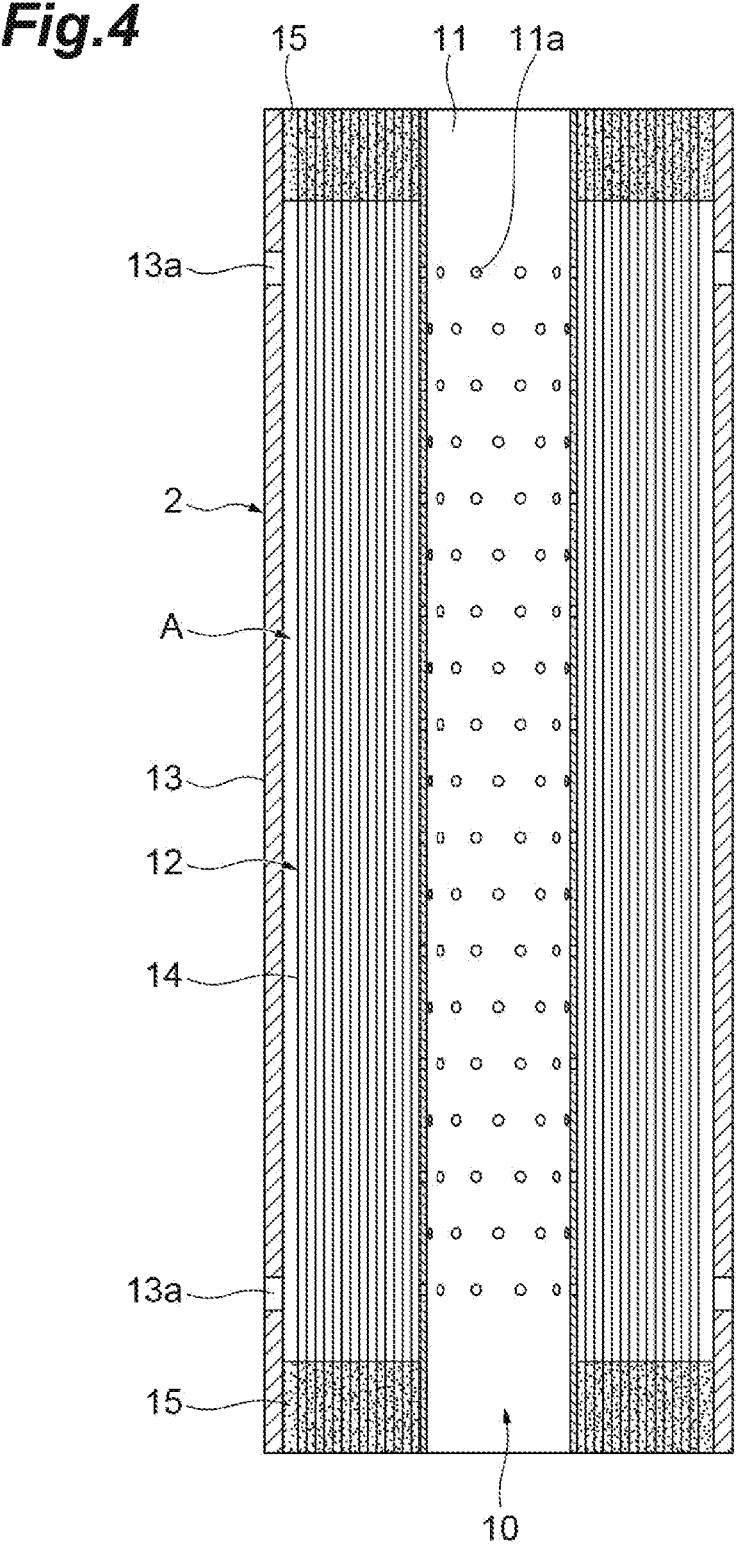
FIG. 4 is a schematic cross-sectional view of a degasification module.

The degasification system of the present embodiment is a system for degasifying a liquid. As the liquid to be degasified by the degasification system, water is exemplified. As shown in FIGS. 1 and 2, the degasification system 1 of the present embodiment includes a degasification unit 3 in which a plurality of degasification modules 2 are connected, a housing 4 which houses the degasification unit 3, and a suction pipe 5.

[Degasification Module]

As shown in FIGS. 1 to 4, the degasification module 2 includes a module inner pipe 11, a hollow fiber membrane bundle 12, and a module container 13.

The module inner pipe 11 is a pipe on an inner peripheral side of which a liquid supply path 10 to which a liquid such as water is supplied is formed. The module inner pipe 11 is formed, for example, in a circular pipe shape extending linearly. A plurality of inner pipe openings 11a are formed in the module inner pipe 11. The inner pipe openings 11a are for passing the liquid supplied to the liquid supply path 10 of the module inner pipe 11. The number, the positions, the sizes, and the like of the inner pipe openings 11a are not particularly limited.

The hollow fiber membrane bundle 12 has a plurality of hollow fiber membranes 14 arranged around the module inner pipe 11. Therefore, the liquid supply path 10 is disposed on the inner peripheral side of the hollow fiber membrane bundle 12. The hollow fiber membrane bundle 12 is configured by, for example, the plurality of hollow fiber membranes 14 being bundled in a cylindrical shape such as a circular cylindrical shape. The hollow fiber membrane 14 is a hollow fiber-like membrane that allows a gas to permeate but does not allow a liquid to permeate. Then, in the hollow fiber membrane bundle 12, the inside of the hollow fiber membrane 14 is depressurized, and thus the liquid flowing out from the inner pipe openings 11a of the module inner pipe 11 is degasified.

A material, a membrane shape, a membrane form, and the like of the hollow fiber membrane 14 are not particularly limited. Examples of the material of the hollow fiber membrane 14 include polyolefin-based resins such as polypropylene and poly (4-methylpentene-1), silicone-based resins such as polydimethylsiloxane and copolymers thereof, and fluorine-based resins such as PTFE and vinylidene fluoride. Examples of the membrane shape (a side wall shape) of the hollow fiber membrane 14 include a porous membrane, a microporous membrane, and a homogeneous membrane having no porous material (a non-porous membrane).

Examples of the membrane form of the hollow fiber membrane 14 include a symmetric membrane (a homogeneous membrane) in which a chemical or physical structure of the entire membrane is homogeneous and an asymmetric membrane (an inhomogeneous membrane) in which a chemical or physical structure of the membrane differs depending on a portion of the membrane. The asymmetric membrane (the inhomogeneous membrane) is a membrane having a non-porous dense layer and the porous material. In this case, the dense layer may be formed in any portion of the membrane such as a surface layer portion of the membrane or the inside of the porous membrane. The inhomogeneous membrane also includes a composite film having different chemical structures and a multilayer structure film such as a three-layer structure.

The hollow fiber membrane bundle 12 can be formed, for example, by a woven fabric (not shown) in which the plurality of hollow fiber membranes 14 which are weft threads are woven with warp threads. This woven fabric is also called a hollow fiber membrane sheet, and the plurality of hollow fiber membranes 14 are woven in a bamboo blind shape. This woven fabric is constituted by, for example, 30 to 90 hollow fiber membranes 14 per inch. Then, it is possible to configure the hollow fiber membrane bundle 12 in a circular cylindrical shape by winding the woven fabric around the module inner pipe 11 (the periphery of the liquid supply path) such that the plurality of hollow fiber membranes 14 extend in an axial direction of the module inner pipe 11 (the liquid supply path 10).

The module container 13 is a container that houses the hollow fiber membrane bundle 12. A region between the module inner pipe 11 and the module container 13 is a degasification region A in which the liquid is degasified by the hollow fiber membrane bundle 12. The module container 13 is formed, for example, in a circular cylindrical shape extending in the axial direction of the module inner pipe 11 (the liquid supply path 10), and both ends thereof are opened. A plurality of discharge ports 13a are formed in the module container 13. The discharge ports 13a are for discharging the liquid that has passed through the hollow fiber membrane bundle 12 in the degasification region A from the module container 13 (the degasification module 2). The number, the positions, the sizes, and the like of the discharge ports 13a are not particularly limited.

Figure 5:
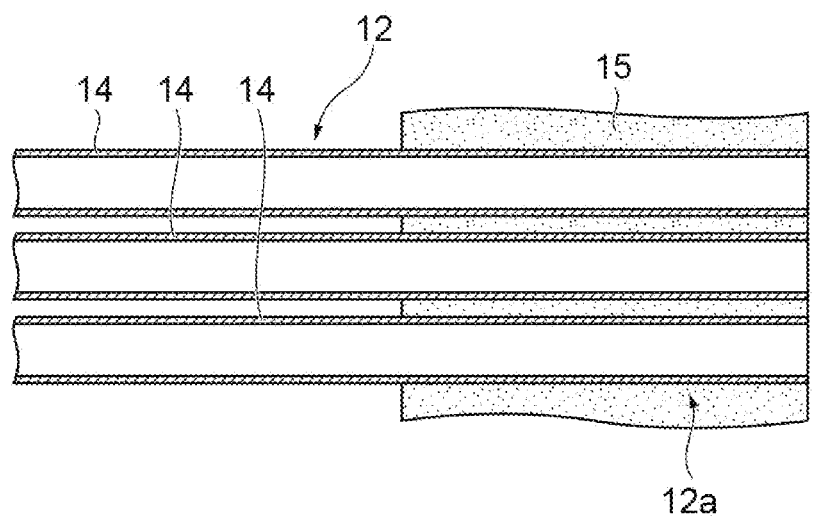
FIG. 5 is a schematic cross-sectional view of an end portion of a hollow fiber membrane bundle.
Figure 6:
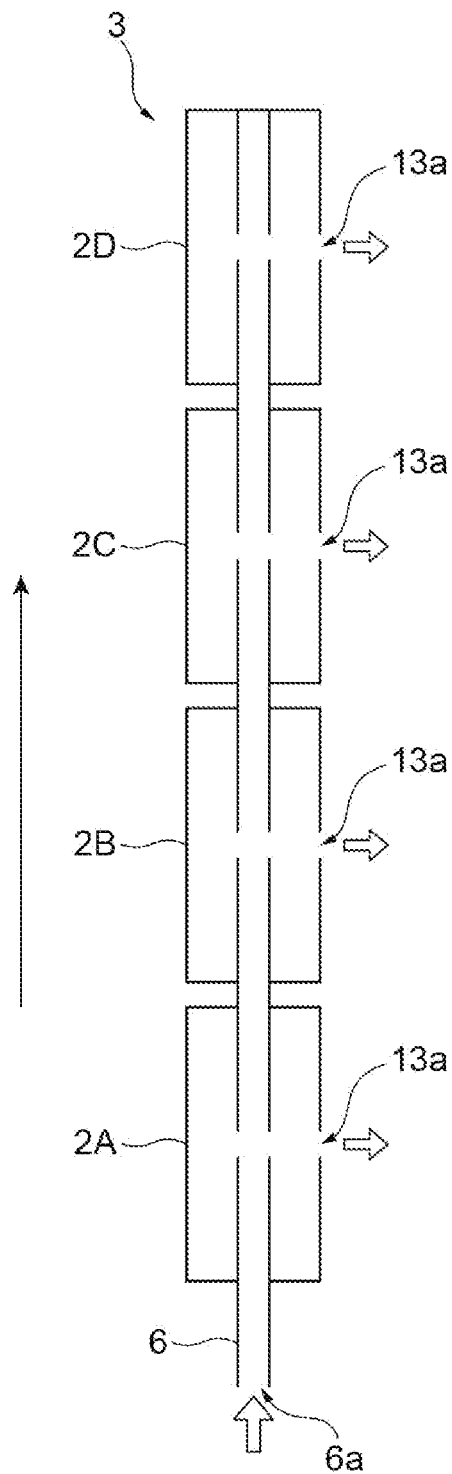
FIG. 6 is a schematic diagram abstractly showing a degasification unit shown in FIG. 1.

As shown in FIG. 5, end portions 12a on both sides of the hollow fiber membrane bundle 12 are fixed to the module inner pipe 11 and the module container 13 by a sealing portion 15.

The sealing portion 15 is formed of, for example, a resin. Examples of the resin used for the sealing portion 15 include an epoxy resin, a urethane resin, an ultraviolet curable resin, and a polyolefin resin such as polyethylene and polypropylene. The sealing portion 15 fills the entire region between the module inner pipe 11 and the module container 13 except for the inside of the hollow fiber membrane 14. That is, the sealing portion 15 fills a portion between the hollow fiber membranes 14, a portion between the hollow fiber membrane bundle 12 and the module inner pipe 11, and a portion between the hollow fiber membranes 14 and the module container 13, but does not fill the inside of the hollow fiber membrane 14. Therefore, the inside of the hollow fiber membrane 14 is opened from the sealing portion 15 to both end sides of the degasification module 2, and it is possible to suction the inside of the hollow fiber membrane 14 from both end sides of the degasification module 2. That is, openings at both ends of the module container 13 are suction openings that open or expose the inside of the hollow fiber membrane 14 to be capable of suctioning and depressurizing the inside of the hollow fiber membrane 14.

[Degasification Unit]

As shown in FIGS. 1 to 6, the degasification unit 3 has a connection supply pipe 6 that connects the liquid supply paths 10 of the plurality of degasification modules 2 in series. The connection supply pipe 6 is one long pipe connected to the plurality of degasification modules 2, and the liquid supply paths 10 of the plurality of degasification modules 2 are formed on an inner peripheral side thereof. Therefore, the plurality of degasification modules 2 are connected in series by the connection supply pipe 6 in appearance. The number of degasification modules 2 constituting the degasification unit 3 is not particularly limited, but will be described below as an example in which four degasification modules 2 are connected. The four degasification modules 2 are referred to as a degasification module 2A, a degasification module 2B, a degasification module 2C, and a degasification module 2D in the order of a flow direction of the liquid in the connection supply pipe 6. The degasification module 2A is a degasification module 2 which is disposed on the most upstream side, and the degasification module 2D is a degasification module 2 which is disposed on the most downstream side. The degasification unit 3 is erected in the vertical direction, for example, such that the liquid flows from the bottom to the top in the connection supply pipe 6. In this case, the degasification module 2A which is disposed on the most upstream side is disposed on the lowest side, and the degasification module 2D which is disposed on the most downstream side is disposed on the uppermost side.

A supply port 6a through which the liquid is supplied to the connection supply pipe 6 is formed at an upstream end of the connection supply pipe 6. A downstream end of the connection supply pipe 6 is sealed. The inner peripheral side of the connection supply pipe 6 forming the liquid supply paths 10 of the plurality of degasification modules 2 is penetrated from an upstream side to a downstream side. Therefore, on the inner peripheral side of the connection supply pipe 6 (the module inner pipe 11 of each degasification module 2), a member that becomes a resistance to the flow of the liquid may be disposed, but a member that seals the connection supply pipe 6 to block the flow of the liquid is not disposed. Then, the liquid supplied from the supply port 6a is supplied to the liquid supply paths 10 of the plurality of degasification modules 2 in series by the connection supply pipe 6.

In the connection supply pipe 6, openings 6b through which the liquid passes are formed at positions corresponding to the plurality of degasification modules 2 such that the liquid is supplied to the hollow fiber membrane bundles 12 of the plurality of degasification modules 2 in parallel. Therefore, the liquid supplied to the supply port 6a of the connection supply pipe 6 is supplied (flows out) to the degasification region A of each degasification module 2 from the openings 6b formed at a position corresponding to each degasification module 2. Accordingly, the liquid is supplied to the hollow fiber membrane bundles 12 of the plurality of degasification modules 2 in parallel.

Each degasification module 2 and the connection supply pipe 6 may be in close contact with each other or may be separated from each other. In a case in which each degasification module 2 and the connection supply pipe 6 are in close contact with each other, the inner pipe openings 11a of each degasification module 2 and the openings 6b of the connection supply pipe 6 are formed at positions where they overlap at least in part, and thus it is possible to supply the liquid from the connection supply pipe 6 to the degasification region A of each degasification module 2. On the other hand, in a case in which each degasification module 2 and the connection supply pipe 6 are separated from each other, a flow path through which the liquid flows is formed in a space therebetween, and thus it is possible to supply the liquid from the connection supply pipe 6 to the degasification region A of each degasification module 2 regardless of a positional relationship between the inner pipe openings 11a of each degasification module 2 and the openings 6b of the connection supply pipe 6.

As shown in FIGS. 1 and 2, an inlet 4a through which the liquid is supplied from the outside of the housing 4 and an outlet 4b through which the liquid is discharged from the housing 4 are formed in the housing 4.

The inlet 4a is formed, for example, at a lower end portion of the housing 4. The inlet 4a communicates with the supply port 6a of the connection supply pipe 6. Therefore, the liquid supplied from the inlet 4a is supplied to the connection supply pipe 6 from the supply port 6a.

The outlet 4b is formed, for example, at an upper end portion of the housing 4. The outlet 4b communicates with each discharge port 13a of the module container 13. Therefore, the liquid discharged from each discharge port 13a is discharged from the outlet 4b of the housing 4.

The housing 4 is provided with a housing sealing portion 7 and a degasification unit supporting portion 8.

The housing sealing portion 7 fixes an upstream end portion of the connection supply pipe 6 to an inner peripheral surface of the housing 4. Further, the housing sealing portion 7 partitions an internal region of the housing 4 into an upstream side region B on the inlet 4a side and a downstream side region C on the outlet 4b side via the degasification unit 3. As the housing sealing portion 7, for example, a resin lined with a metal such as stainless steel, a fiber reinforced plastic (FRP), or a metal such as iron is used.

The housing sealing portion 7 fills the entire region between the connection supply pipe 6 and the housing 4 except for the inside of the connection supply pipe 6. That is, the housing sealing portion 7 fills a portion between the connection supply pipe 6 and the housing 4, but does not fill the inside of the connection supply pipe 6. Therefore, the inside of the connection supply pipe 6 is opened from the supply port 6a to the upstream side region B, and the liquid supplied from the inlet 4a to the upstream side region B is supplied to the inside of the connection supply pipe 6 from only the supply port 6a and is further supplied to the degasification region A of each degasification module 2 from the openings 6b and the inner pipe openings 11a.

Further, the housing sealing portion 7 is disposed on the upstream side of all the discharge ports 13a in the flow direction of the liquid flowing through the connection supply pipe 6. Therefore, the inside of the module container 13 is opened from the discharge ports 13a to the downstream side region C, and the liquid supplied from the openings 6b and the inner pipe openings 11a to the degasification region A is discharged to the downstream side region C from only the discharge ports 13a and is further discharged to the outside of the housing 4 from the outlet 4b.

The degasification unit supporting portion 8 is fixed to an upper end portion of the degasification unit 3 and the housing 4 and supports the upper end portion of the degasification unit 3. The degasification unit supporting portion 8 is formed, for example, in a rod shape extending from the degasification unit 3 to the housing 4 and does not seal a portion between the degasification unit 3 and the housing 4. Therefore, the liquid discharged from the discharge ports 13a to the downstream side region C is discharged from the outlet 4b to the outside of the housing 4 without being blocked by the degasification unit supporting portion 8.

The suction pipe 5 communicates with the inside of the plurality of hollow fiber membranes 14 of each of the plurality of degasification modules 2 to suction (to vacuum-evacuate) the inside of the plurality of the hollow fiber membranes 14. Further, the suction pipe 5 penetrates the housing 4 and extends to the outside of the housing 4 for the suction by a suction pump such as a vacuum pump provided outside the housing 4. As described above, the inside of the hollow fiber membrane 14 is opened from the sealing portion 15 to both end sides of the degasification module 2. Therefore, the suction pipe 5 is connected to both ends of the degasification module 2 to which the inside of the hollow fiber membrane 14 is opened. Accordingly, it is possible to suction the inside of the hollow fiber membrane 14 from both end sides of the degasification module 2 by suctioning the suction pipe 5.

Further, as described above, since the plurality of degasification modules 2 are connected in series by the connection supply pipe 6 in appearance, end faces of the degasification modules on opposite sides are disposed to face each other between the degasification modules 2 adjacent to each other along the connection supply pipe 6. Therefore, one suction pipe 5 may be connected to the facing end faces.

Next, a liquid degasification method by the degasification system 1 will be described.

First, a liquid such as water is supplied from the inlet 4a of the housing 4 to the upstream side region B of the housing 4. Then, the liquid supplied to the upstream side region B is supplied to the connection supply pipe 6 from the supply port 6a and is supplied to the degasification region A of each degasification module 2 through the openings 6b of the connection supply pipe 6 and the inner pipe openings 11a of each degasification module 2. Accordingly, the liquid is supplied to the hollow fiber membrane bundles 12 of the plurality of degasification modules 2 in parallel. In the degasification region A, the liquid supplied from the inner pipe openings 11a passes between the plurality of hollow fiber membranes 14 in the hollow fiber membrane bundle 12 and then is discharged from the discharge ports 13a. At this time, the suction pipe 5 is suctioned, and the inside of the plurality of hollow fiber membranes 14 is depressurized, and thus a dissolved gas, bubbles, and the like of the liquid passing between the plurality of hollow fiber membranes 14 are removed. Then, the degasified liquid is discharged from the discharge ports 13a to the downstream side region C and further discharged from the outlet 4b to the outside of the housing 4.

Here, a flow rate of the liquid flowing through each degasification module was analyzed for a degasification system of a reference example in which four degasification modules are connected. The degasification modules were set to be the same and were set as a first degasification module, a second degasification module, a third degasification module, and a fourth degasification module in the order of a flow direction of the liquid. As analysis software, ANSYS Fluent Ver. 18.2 was used. For the liquid, seawater was used as a model, and a density thereof was set to 1025.5 kg/m$^3$ and a viscosity thereof was set to 0.001164 Pa s. For the hollow fiber membrane bundle, a porous material (a flow path having a pressure resistance) was used as a model, and a pressure coefficient thereof was set to $1.9 \times 10^{10}$ from an analysis value of one degasification module. In the analysis for obtaining the pressure coefficient, EF-040P manufactured by DIC Corporation was used. The total flow rate of the liquid supplied to the degasification system of the reference example was set in two types of 4 m$^3$/h and 24 m$^3$/h. The analysis results are shown in FIG. 7.

As shown in FIG. 7, in any of the total flow rates, the flow rate of the liquid flowing through the degasification module was increased toward the downstream side, and the flow rate of the liquid flowing through the degasification module was decreased toward the upstream side. Further, as the total flow rate was increased, a deviation rate in the flow rate of the liquid flowing through each degasification module was increased. The deviation rate is the maximum deviation rate on each of a positive side and a negative side with respect to an ideal flow rate of the liquid flowing through each degasification module. The ideal flow rate of the liquid flowing through each degasification module is a value obtained by dividing the total flow rate by the number of degasification modules (four in the reference example).

Figure 8:
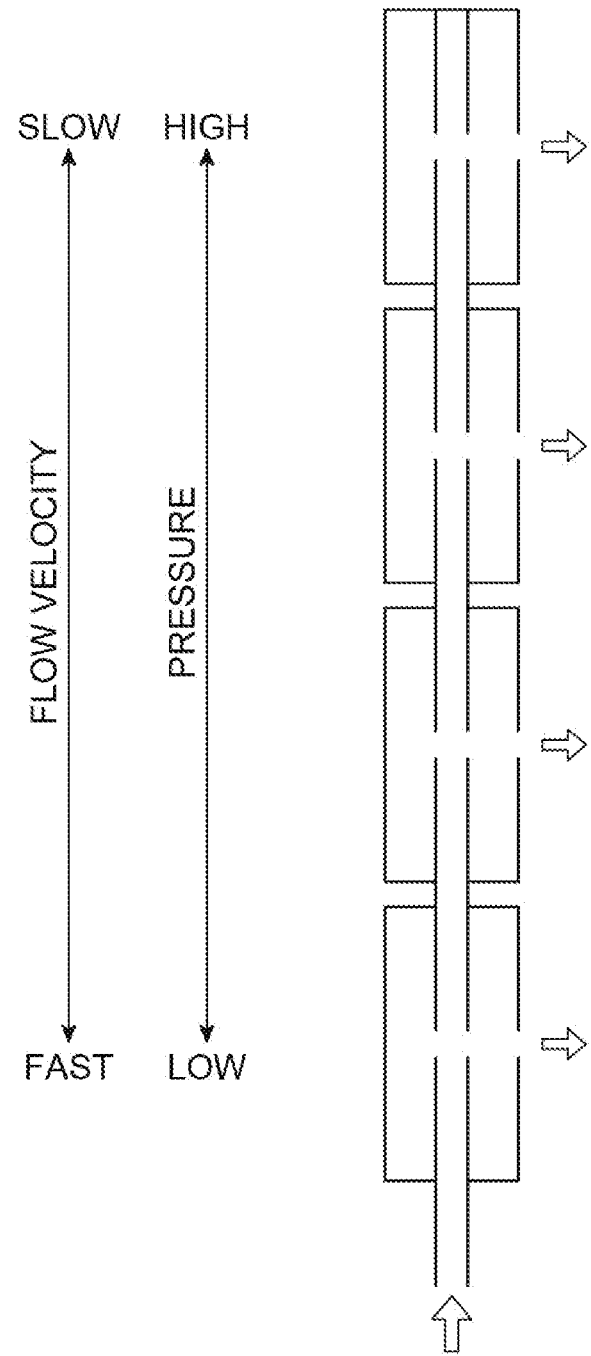
FIG. 8 is a diagram for explaining a flow velocity and a pressure of a liquid in each degasification unit.

In addition, a flow velocity and a pressure of the liquid flowing through each degasification module were also analyzed. The analysis conditions are the same as above. A diagram in which the analysis results are modeled is shown in FIG. 8. A degasification unit shown in FIG. 8 corresponds to the degasification unit 3 shown in FIG. 6. As shown in FIG. 8, since the liquid supplied to the connection supply pipe flows out sequentially from the upstream side to the degasification regions of the degasification modules, the flow velocity of the liquid flowing through the connection supply pipe decreases from the upstream side toward the downstream side. Then, the pressure of the liquid flowing through the connection supply pipe increases from the upstream side toward the downstream side. In other words, the pressure of the liquid flowing through the connection supply pipe decreases from the downstream side toward the upstream side. This has been clarified by the research of the present inventors, but it can also be said from Bernoulli's theorem. According to Bernoulli's theorem, in a non-viscous and incompressible steady flow without external force, the pressure increases as the velocity decreases. Therefore, the flow rate of the liquid flowing through the degasification modules increases toward the downstream side, and the flow rate of the liquid flowing through the degasification modules decreases toward the upstream side. The degasification performance of the degasification module varies greatly depending on the flow rate of the liquid. In the degasification system of the reference example, since the deviation in the flow rate of the liquid is large between the degasification module on the upstream side and the degasification module on the downstream side, the degasification performance of the degasification system in its entirety is significantly lower than the degasification performance of a single degasification module.

Therefore, in the present embodiment, a pressure loss of the liquid is appropriately set, and thus the deviation in the flow rate of the liquid between the degasification module 2 on the upstream side and the degasification module 2 on the downstream side is reduced, and the degasification performance of the degasification system 1 in its entirety is improved.

Specifically, in the plurality of degasification modules 2, any one degasification module 2 is designated as the degasification module 2 on the upstream side (an upstream side degasification module), and a degasification module 2 on the downstream side of the upstream side module is designated as the degasification module 2 on the downstream side (a downstream side degasification module). For example, in a case in which the degasification module 2A is designated as the degasification module 2 on the upstream side, any one of the degasification module 2B, the degasification module 2C, and the degasification module 2D becomes the degasification module 2 on the downstream side. Then, the degasification unit 3 is configured such that a pressure loss of the liquid from the supply port 6a of the connection supply pipe 6 to the discharge ports 13a of the degasification module 2 on the downstream side is larger than a pressure loss of the liquid from the supply port 6a to the discharge ports 13a of the degasification module 2 on the upstream side. In the present specification, the pressure loss refers to a pressure loss of the liquid flowing through the degasification system 1. In this case, the degasification unit 3 may be configured such that a pressure loss of the liquid from the openings 6b formed at a position corresponding to the degasification module 2 on the downstream side to the discharge ports 13a of the degasification module 2 on the downstream side is larger than a pressure loss of the liquid from the openings 6b formed at a position corresponding to the degasification module 2 on the upstream side to the discharge ports 13a of the degasification module 2 on the downstream side.

In the plurality of degasification modules 2, any two degasification modules may satisfy the above relationship. For example, the above pressure losses may be the same (substantially the same) between the degasification modules 2 adjacent to each other along the connection supply pipe 6. The fact that the above pressure losses are the same between the degasification modules 2 adjacent to each other along the connection supply pipe 6 means that it also includes a case in which the pressure losses differ by, for example, about 30% due to a manufacturing error or the like.

It is possible to obtain the pressure loss of the liquid from the supply port 6a to the discharge ports 13a of each degasification module 2, for example, by measuring the pressure of the liquid in the supply port 6a and the pressure of the liquid in each of the discharge ports 13a of each degasification module 2 with a pressure gauge or the like and calculating the difference therebetween.

In this way, in the degasification system 1 according to the present embodiment, the liquid is supplied to the hollow fiber membrane bundles 12 of the plurality of degasification modules 2 in parallel by the connection supply pipe 6 that connects the liquid supply paths 10 of the plurality of degasification modules 2 in series. However, the pressure loss of the liquid from the supply port 6a of the connection supply pipe 6 to the discharge ports 13a of the degasification module 2 on the downstream side is larger than the pressure loss of the liquid from the supply port 6a of the connection supply pipe 6 to the discharge ports 13a of the degasification module 2 on the upstream side. Therefore, this difference in pressure loss acts to offset the difference in flow velocity and pressure in the flow direction of the liquid. As a result, the deviation in the flow rate of the liquid between the degasification module 2 on the upstream side and the degasification module 2 on the downstream side is reduced, and thus it is possible to improve the degasification performance of the degasification system 1 in its entirety.

Further, by making the pressure loss of the liquid from the openings 6b formed at a position corresponding to the degasification module 2 on the downstream side to the discharge ports 13a of the degasification module 2 on the downstream side larger than the pressure loss of the liquid from the openings 6b formed at a position corresponding to the degasification module 2 on the upstream side to the discharge ports 13a of the degasification module 2 on the upstream side, it becomes more difficult for the liquid to flow in the degasification module 2 on the downstream side than in the degasification module 2 on the upstream side. Accordingly, the degasification performance of the degasification system 1 in its entirety can be improved.

Here, the pressure loss from the supply port 6a to the discharge ports 13a of each degasification module 2 is the sum of, for example, [1] a pressure loss of the liquid in the connection supply pipe 6, [2] a pressure loss of the liquid in the openings 6b of the connection supply pipe 6, [3] a pressure loss of the liquid in the inner pipe openings 11a of the module inner pipe 11, [4] a pressure loss of the liquid in the hollow fiber membrane bundle 12, and [5] a pressure loss of the liquid in the discharge ports 13a of the module container 13. Therefore, for example, by adjusting a part or all of these pressure losses, it is possible to make the pressure loss from the supply port 6a to the discharge ports 13a of the degasification module 2 on the downstream side larger than the pressure loss from the supply port 6a to the discharge ports 13a of the degasification module 2 on the upstream side.

Regarding [1] the pressure loss of the liquid in the connection supply pipe 6, the connection supply pipe 6 is configured such that the pressure loss of the liquid of the connection supply pipe 6 at a position corresponding to the degasification module 2 on the downstream side is larger than the pressure loss of the liquid of the connection supply pipe 6 at a position corresponding to the degasification module 2 on the upstream side.

By making the pressure loss of the liquid of the connection supply pipe 6 at a position corresponding to the degasification module 2 on the downstream side larger than the pressure loss of the liquid of the connection supply pipe 6 at a position corresponding to the degasification module 2 on the upstream side, it is possible to make the pressure loss of the liquid from the supply port 6a of the connection supply pipe 6 to the discharge ports 13a of the degasification module 2 on the downstream side larger than the pressure loss of the liquid from the supply port 6a of the connection supply pipe 6 to the discharge ports 13a of the degasification module 2 on the upstream side.

Specifically, for example, an inner diameter of the connection supply pipe 6 at a position corresponding to the degasification module 2 on the downstream side may be smaller than an inner diameter of the connection supply pipe 6 at a position corresponding to the degasification module 2 on the upstream side. In this case, for example, as the connection supply pipe 6, a pipe having an inner diameter that narrows in a tapered shape from the upstream side toward the downstream side may be used, and a pipe having an inner diameter that gradually narrows from the upstream side toward the downstream side may be used. Thereby, it is possible to make the pressure loss of the liquid of the connection supply pipe 6 at a position corresponding to the degasification module 2 on the downstream side larger than the pressure loss of the liquid of the connection supply pipe 6 at a position corresponding to the degasification module 2 on the upstream side.

Regarding [2] the pressure loss of the liquid in the openings 6*b* of the connection supply pipe 6, the openings 6*b* formed at a position corresponding to the degasification module 2 on the downstream side are configured such that a pressure loss of the liquid in the openings 6*b* formed at a position corresponding to the degasification module 2 on the downstream side is larger than that in the openings 6*b* formed at a position corresponding to the degasification module 2 on the upstream side.

In this way, by making the pressure loss of the liquid in the openings 6*b* formed at a position corresponding to the degasification module 2 on the downstream side larger than the pressure loss of the liquid in the openings 6*b* formed at a position corresponding to the degasification module 2 on the upstream side, it is possible to make the pressure loss of the liquid from the supply port 6*a* of the connection supply pipe 6 to the discharge ports 13*a* of the degasification module 2 on the downstream side larger than the pressure loss of the liquid from the supply port 6*a* of the connection supply pipe 6 to the discharge ports 13*a* of the degasification module 2 on the upstream side.

Specifically, for example, a total area of the openings 6*b* formed at a position corresponding to the degasification module 2 on the downstream side may be smaller than a total area of the openings 6*b* formed at a position corresponding to the degasification module 2 on the upstream side. Further, for example, the number of the openings 6*b* formed at a position corresponding to the degasification module 2 on the downstream side may be smaller than the number of the openings 6*b* formed at a position corresponding to the degasification module 2 on the upstream side. Further, for example, a size of each of the openings 6*b* formed at a position corresponding to the degasification module 2 on the downstream side may be smaller than a size of each of the openings 6*b* formed at a position corresponding to the degasification module 2 on the upstream side. Thereby, it is possible to make the pressure loss of the liquid in the openings 6*b* formed at a position corresponding to the degasification module 2 on the downstream side larger than the pressure loss of the liquid in the openings 6*b* formed at a position corresponding to the degasification module 2 on the upstream side.

Regarding [3] the pressure loss of the liquid in the inner pipe openings 11*a* of the module inner pipe 11, the inner pipe openings 11*a* of the degasification module 2 on the downstream side are configured such that a pressure loss of the liquid in the inner pipe openings 11*a* of the degasification module 2 on the downstream side is larger than that in the inner pipe openings 11*a* of the degasification module 2 on the upstream side.

In this way, by making the pressure loss of the liquid in the inner pipe openings 11*a* of the degasification module 2 on the downstream side larger than the pressure loss of the liquid in the inner pipe openings 11*a* of the degasification module 2 on the upstream side, it is possible to make the pressure loss of the liquid from the supply port 6*a* of the connection supply pipe 6 to the discharge ports 13*a* of the degasification module 2 on the downstream side larger than the pressure loss of the liquid from the supply port 6*a* of the connection supply pipe 6 to the discharge ports 13*a* of the degasification module 2 on the upstream side.

Specifically, for example, a total area of the inner pipe openings 11*a* of the degasification module 2 on the downstream side may be smaller than a total area of the inner pipe openings 11*a* of the degasification module 2 on the upstream side. Further, for example, the number of the inner pipe openings 11*a* of the degasification module 2 on the downstream side may be smaller than the number of the inner pipe openings 11*a* of the degasification module 2 on the upstream side. Further, for example, a size of each of the inner pipe openings 11*a* of the degasification module 2 on the downstream side may be smaller than a size of each of the inner pipe openings 11*a* of the degasification module 2 on the upstream side. Thereby, it is possible to make the pressure loss of the liquid in the inner pipe openings 11*a* of the degasification module 2 on the downstream side larger than the pressure loss of the liquid in the inner pipe openings 11*a* of the degasification module 2 on the upstream side.

Regarding [4] the pressure loss of the liquid in the hollow fiber membrane bundle 12, the hollow fiber membrane bundle 12 of the degasification module 2 on the downstream side is configured such that a pressure loss in the hollow fiber membrane bundle 12 of the degasification module 2 on the downstream side is larger than that in the hollow fiber membrane bundle 12 of the degasification module 2 on the upstream side.

By making the pressure loss of the liquid in the hollow fiber membrane bundle 12 of the degasification module 2 on the downstream side larger than the pressure loss of the liquid in the hollow fiber membrane bundle 12 of the degasification module 2 on the upstream side, it is possible to make the pressure loss of the liquid from the supply port 6*a* of the connection supply pipe 6 to the discharge ports 13*a* of the degasification module 2 on the downstream side larger than a pressure loss of the liquid from the supply port 6*a* of the connection supply pipe 6 to the discharge ports 13*a* of the degasification module 2 on the upstream side.

Specifically, for example, a density of the plurality of hollow fiber membranes 14 in the degasification module 2 on the downstream side may be higher than a density of the plurality of hollow fiber membranes 14 in the degasification module 2 on the upstream side. When the density of the plurality of hollow fiber membranes 14 is made high, a gap between the plurality of hollow fiber membranes 14 is narrowed, and the passage resistance of the liquid to the hollow fiber membrane bundle 12 is increased. Therefore, the pressure loss of the liquid in the hollow fiber membrane bundle 12 of the degasification module 2 on the downstream side becomes larger than the pressure loss of the liquid in the hollow fiber membrane bundle 12 of the degasification module 2 on the upstream side.

Further, for example, a thickness of the hollow fiber membrane bundle 12 in the degasification module 2 on the downstream side may be thicker than a thickness of the hollow fiber membrane bundle 12 in the degasification module 2 on the upstream side. When the thickness of the hollow fiber membrane bundle 12 is made thick, the passage resistance of the liquid to the hollow fiber membrane bundle 12 is increased. Therefore, the pressure loss of the liquid in the hollow fiber membrane bundle 12 of the degasification module 2 on the downstream side becomes larger than the pressure loss of the liquid in the hollow fiber membrane bundle 12 of the degasification module 2 on the upstream side.

Further, in a case in which the hollow fiber membrane bundle 12 is formed by a woven fabric obtained by weaving the plurality of hollow fiber membranes 14, which are weft threads, with warp threads being wound around the module inner pipe 11 (the periphery of the liquid supply path 10), for example, a winding pressure of the woven fabric in the degasification module 2 on the downstream side may be higher than a winding pressure of the woven fabric in the degasification module 2 on the upstream side. In this case, the woven fabric may be wound around the module inner pipe 11 (the periphery of the liquid supply path 10) such that the plurality of hollow fiber membranes 14 extend in the axial direction of the module inner pipe 11 (the liquid supply path 10). When the winding pressure of the wound woven fabric is made high, a gap between the plurality of hollow fiber membranes 14 is narrowed, and the passage resistance of the liquid to the hollow fiber membrane bundle 12 is increased. Therefore, the pressure loss of the liquid in the hollow fiber membrane bundle 12 of the degasification module 2 on the downstream side becomes larger than the pressure loss of the liquid in the hollow fiber membrane bundle 12 of the degasification module 2 on the upstream side.

Similarly, in a case in which the hollow fiber membrane bundle 12 is formed by a woven fabric obtained by weaving the plurality of hollow fiber membranes 14, which are weft threads, with warp threads being wound around the module inner pipe 11 (the periphery of the liquid supply path 10) such that the plurality of hollow fiber membranes 14 extend in the axial direction of the module inner pipe 11 (the liquid supply path 10), for example, a pitch between the warp threads in the degasification module 2 on the downstream side may be longer than a pitch between the warp threads in the degasification module 2 on the upstream side. When the woven fabric is wound around the module inner pipe 11, the hollow fiber membrane 14 on the outer peripheral side tends to enter between the adjacent hollow fiber membranes 14 on the inner peripheral side. In this case, if the pitch between the warp threads in the degasification module 2 is short, a gap between the hollow fiber membranes on the inner peripheral side which are supported by the warp threads is narrowed, and thus the hollow fiber membrane 14 on the outer peripheral side is difficult to enter between the adjacent hollow fiber membranes 14 on the inner peripheral side. As a result, the density of the hollow fiber membranes 14 becomes low. On the other hand, if the pitch between the warp threads in the degasification module 2 is long, a gap between the hollow fiber membranes on the inner peripheral side which are supported by the warp threads is lengthened, and thus the hollow fiber membrane 14 on the outer peripheral side easily enters between the adjacent hollow fiber membranes 14 on the inner peripheral side. As a result, the density of the hollow fiber membranes 14 becomes high. Therefore, the pressure loss of the liquid in the hollow fiber membrane bundle 12 of the degasification module 2 on the downstream side becomes larger than the pressure loss of the liquid in the hollow fiber membrane bundle 12 of the degasification module 2 on the upstream side.

Further, for example, an outer diameter of the hollow fiber membrane 14 in the degasification module 2 on the downstream side may be larger than an outer diameter of the hollow fiber membrane 14 in the degasification module 2 on the upstream side. For example, in a case in which the number of the hollow fiber membranes 14 is the same, when the outer diameter of the hollow fiber membrane 14 is large, a gap between the hollow fiber membranes 14 is narrowed, and the passage resistance of the liquid to the hollow fiber membrane bundle 12 is increased. Therefore, the pressure loss of the liquid in the hollow fiber membrane bundle 12 of the degasification module 2 on the downstream side becomes larger than the pressure loss of the liquid in the hollow fiber membrane bundle 12 of the degasification module 2 on the upstream side.

Further, for example, the hollow fiber membrane 14 in the degasification module 2 on the downstream side may have a higher hydrophilicity than the hollow fiber membrane 14 in the degasification module 2 on the upstream side. When the hydrophilicity of the hollow fiber membrane 14 is made high, the contact resistance of the liquid to the hollow fiber membrane 14 is increased. Therefore, the pressure loss of the liquid in the hollow fiber membrane bundle 12 of the degasification module 2 on the downstream side becomes larger than the pressure loss of the liquid in the hollow fiber membrane bundle 12 of the degasification module 2 on the upstream side.

Regarding [5] the pressure loss of the liquid in the discharge ports 13a of the module container 13, the discharge ports 13a of the degasification module 2 on the downstream side are configured such that a pressure loss of the liquid in the discharge ports 13a of the degasification module 2 on the downstream side is larger than that in the discharge ports 13a of the degasification module 2 on the upstream side.

By making the pressure loss of the liquid in the discharge ports 13a of the degasification module 2 on the downstream side larger than the pressure loss of the liquid in the discharge ports 13a of the degasification module 2 on the upstream side, it is possible to make the pressure loss of the liquid from the supply port 6a of the connection supply pipe 6 to the discharge ports 13a of the degasification module 2 on the downstream side larger than the pressure loss of the liquid from the supply port 6a of the connection supply pipe 6 to the discharge ports 13a of the degasification module 2 on the upstream side.

Specifically, for example, a total area of the discharge ports 13a of the degasification module 2 on the downstream side may be smaller than a total area of the discharge ports 13a of the degasification module 2 on the upstream side. Further, for example, the number of the discharge ports 13a of the degasification module 2 on the downstream side may be smaller than the number of the discharge ports 13a of the degasification module 2 on the upstream side. Further, a size of each of the discharge ports 13a of the degasification module 2 on the downstream side may be smaller than a size of each of the discharge ports 13a of the degasification module 2 on the upstream side. Thereby, it is possible to make the pressure loss of the liquid in the discharge ports 13a of the degasification module 2 on the downstream side larger than the pressure loss of the liquid in the discharge ports 13a of the degasification module 2 on the upstream side.

[Method for Manufacturing Degasification System]

Next, a method for manufacturing the degasification system 1 will be described.

First, a plurality of degasification modules 2 and the connection supply pipe 6 are prepared. Next, the connection supply pipe 6 is inserted into the liquid supply paths 10 of the plurality of degasification modules 2. Then, the liquid supply paths 10 of the plurality of degasification modules 2 are connected in series by the connection supply pipe 6. Further, the plurality of openings 6b of the connection supply pipe 6 are disposed at positions corresponding to the plurality of degasification modules 2 such that the liquid is supplied to the hollow fiber membrane bundles 12 of the plurality of degasification modules 2 in parallel.

Here, in the plurality of degasification modules 2, any one degasification module 2 is designated as the degasification module 2 on the upstream side (an upstream side degasification module), and any one degasification module 2 on the downstream side of the upstream side module is designated as the degasification module 2 on the downstream side (a downstream side degasification module). Then, the pressure loss of the liquid from the supply port 6a of the connection supply pipe 6 to the discharge ports 13a of the degasification module 2 on the downstream side is made larger than the pressure loss of the liquid from the supply port 6a to the discharge ports 13a of the degasification module 2 on the upstream side. Such setting of the pressure loss of the liquid can be performed by the various methods described above.

In the above, the embodiment of the present invention has been described, but the present invention is not limited to the above embodiments. For example, in the above embodiment, the configuration of the degasification module has been specifically described, but as the degasification module, degasification modules in various forms can be used. Further, in the above embodiment, it has been described that each degasification module includes a module inner pipe, but each degasification module may not include such a module inner pipe. In this case, for example, the hollow fiber membrane bundle (the woven fabric) of each degasification module is wound around the connection supply pipe directly.

Further, a use method and a utilization method of the degasification system of the present invention are not particularly limited, and the degasification system of the present invention can be used in the technical field for producing natural resources such as a jet boring method, an in situ leaching method (ISL), and water flooding. Specifically, the degasification system of the present invention may be used in the following method for producing natural resources. That is, the method for producing natural resources in the degasification system of the present invention includes a degasification step of degasifying a liquid by supplying the liquid from the connection supply pipe to the liquid supply paths of the plurality of degasification modules and depressurizing an inside of the plurality of hollow fiber membranes of each of the plurality of degasification modules, and a press-in step of pressing-in the liquid degasified in the degasification step into a natural resource mining site. Here, examples of natural resources include metallic minerals such as copper and uranium, and fuel minerals such as crude oil, natural gas, shale oil, and shale gas. As the liquid, water is exemplified. In a case in which the natural resources are fuel minerals, examples of the liquid include seawater, accompanying water, and fracturing fluid. The accompanying water is the water generated when natural resources are produced. The degasification unit used in the present invention can be transferred to the place of use after the degasification unit is manufactured in advance by the connection of a plurality of degasification modules or can be manufactured by the connection of the degasification modules individually transported in the place of use of the degasification system of the present invention. In the unlikely event that a problem occurs in one of the degasification modules, it is only necessary to replace the corresponding degasification module, which is excellent in handleability during transportation in manufacturing and maintainability during use. Therefore, for example, it is also suitable for use at a mining site for natural resources.

REFERENCE SIGNS LIST

1 Degasification system
2, 2A, 2B, 2C, 2D Degasification module (upstream side degasification module, downstream side degasification module)
3 Degasification unit
4 Housing
4a Inlet
4b Outlet
5 Suction pipe
6 Connection supply pipe
6a Supply port
6b Opening
7 Housing sealing portion
8 Degasification unit supporting portion
10 Liquid supply path
11 Module inner pipe
11a Inner pipe opening
12 Hollow fiber membrane bundle
12a End portion
13 Module container
13a Discharge port
14 Hollow fiber membrane
15 Sealing portion
A Degasification region
B Upstream side region
C Downstream side region

The invention claimed is:

1. A degasification system comprising:
a degasification unit in which a plurality of degasification modules degasifying a liquid are connected,
wherein each of the plurality of degasification modules has
a hollow fiber membrane bundle having a plurality of hollow fiber membranes arranged around a liquid supply path through which a liquid is supplied, and
a module container which houses the hollow fiber membrane bundle and in which discharge ports for discharging the liquid are formed,
wherein the degasification unit has a connection supply pipe which connects the liquid supply paths of the plurality of degasification modules in series and in which openings through which the liquid passes are formed at positions corresponding to the plurality of degasification modules such that the liquid is supplied to the hollow fiber membrane bundles of the plurality of degasification modules in parallel,
wherein the plurality of degasification modules include an upstream side degasification module and a downstream side degasification module disposed on a downstream side of the upstream side degasification module, and
wherein the degasification unit is configured such that a pressure loss of the liquid from a supply port of the connection supply pipe through which the liquid is supplied to the discharge ports of the downstream side degasification module is larger than a pressure loss of the liquid from the supply port to the discharge ports of the upstream side degasification module.

2. The degasification system according to claim 1, wherein the degasification unit is configured such that a pressure loss of the liquid from the openings formed at a position corresponding to the downstream side degasification module to the discharge ports of the downstream side degasification module is larger than a pressure loss of the liquid from the openings formed at a position corresponding to the upstream side degasification module to the discharge ports of the upstream side degasification module.

3. The degasification system according to claim 1, wherein the connection supply pipe is configured such that a pressure loss of the liquid at a position corresponding to the downstream side degasification module is larger than a pressure loss of the liquid at a position corresponding to the upstream side degasification module.

4. The degasification system according to claim 1, wherein an inner diameter of the connection supply pipe at a position corresponding to the downstream side degasification module is smaller than an inner diameter of the connection supply pipe at a position corresponding to the upstream side degasification module.

5. The degasification system according to claim 1, wherein the openings formed at a position corresponding to the downstream side degasification module are configured such that a pressure loss of the liquid in the openings formed at a position corresponding to the downstream side degasification module is larger than that in the openings formed at a position corresponding to the upstream side degasification module.

6. The degasification system according to claim 1, wherein a total area of the openings formed at a position corresponding to the downstream side degasification module is smaller than a total area of the openings formed at a position corresponding to the upstream side degasification module.

7. The degasification system according to claim 1, wherein the number of the openings formed at a position corresponding to the downstream side degasification module is smaller than the number of the openings formed at a position corresponding to the upstream side degasification module.

8. The degasification system according to claim 1, wherein a size of each of the openings formed at a position corresponding to the downstream side degasification module is smaller than a size of each of the openings formed at a position corresponding to the upstream side degasification module.

9. The degasification system according to claim 1,
wherein each of the plurality of degasification modules further has a module inner pipe which is disposed on an inner peripheral side of the hollow fiber membrane bundle and in which inner pipe openings through which the liquid passes are formed, and
wherein the inner pipe openings of the downstream side degasification module are configured such that a pressure loss of the liquid in the inner pipe openings of the downstream side degasification module is larger than that in the inner pipe openings of the upstream side degasification module.

10. The degasification system according to claim 1, wherein the hollow fiber membrane bundle of the downstream side degasification module is configured such that a pressure loss of the liquid in the hollow fiber membrane bundle of the downstream side degasification module is larger than that in the hollow fiber membrane bundle of the upstream side degasification module.

11. The degasification system according to claim 1, wherein a density of the plurality of hollow fiber membranes in the downstream side degasification module is higher than a density of the plurality of hollow fiber membranes in the upstream side degasification module.

12. The degasification system according to claim 1, wherein a thickness of the hollow fiber membrane bundle in the downstream side degasification module is thicker than a thickness of the hollow fiber membrane bundle in the upstream side degasification module.

13. The degasification system according to claim 1,
wherein the hollow fiber membrane bundle is formed by a woven fabric obtained by weaving the plurality of hollow fiber membranes, which are weft threads, with warp threads being wound around the liquid supply path, and
wherein a winding pressure of the woven fabric in the downstream side degasification module is higher than a winding pressure of the woven fabric in the upstream side degasification module.

14. The degasification system according to claim 1,
wherein the hollow fiber membrane bundle is formed by a woven fabric obtained by weaving the plurality of hollow fiber membranes, which are weft threads, with warp threads being wound around the liquid supply path such that the plurality of hollow fiber membranes extend in an axial direction of the liquid supply path, and
wherein a pitch between the warp threads in the downstream side degasification module is longer than a pitch between the warp threads in the upstream side degasification module.

15. The degasification system according to claim 1, wherein an outer diameter of the hollow fiber membrane in the downstream side degasification module is larger than an outer diameter of the hollow fiber membrane in the upstream side degasification module.

16. The degasification system according to claim 1, wherein the hollow fiber membrane in the downstream side degasification module has a higher hydrophilicity than the hollow fiber membrane in the upstream side degasification module.

17. The degasification system according to claim 1, wherein the discharge ports of the downstream side degasification module are configured such that a pressure loss of the liquid in the discharge ports of the downstream side degasification module is larger than that in the discharge ports of the upstream side degasification module.

18. The degasification system according to claim 1, wherein a total area of the discharge ports of the downstream side degasification module is smaller than a total area of the discharge ports of the upstream side degasification module.

19. The degasification system according to claim 1, wherein the number of the discharge ports of the downstream side degasification module is smaller than the number of the discharge ports of the upstream side degasification module.

20. The degasification system according to claim 1, wherein a size of each of the discharge ports of the downstream side degasification module is smaller than a size of each of the discharge ports of the upstream side degasification module.

21. The degasification system according to claim 1, further comprising:
a housing which houses the degasification unit and in which an inlet through which a liquid is supplied from outside and an outlet through which a liquid is discharged to the outside are formed; and
a suction pipe communicating with an inside of the plurality of hollow fiber membranes of each of the plurality of degasification modules to suction the inside of the plurality of the hollow fiber membranes.

22. A liquid degasification method in the degasification system according to claim 1, comprising:
  degasifying a liquid by supplying the liquid from the connection supply pipe to the liquid supply paths of the plurality of degasification modules and depressurizing an inside of the plurality of hollow fiber membranes of each of the plurality of degasification modules.

23. A degasification module used in the degasification system according to claim 1, comprising:
  a hollow fiber membrane bundle having a plurality of hollow fiber membranes arranged around a liquid supply path through which a liquid is supplied; and
  a module container which houses the hollow fiber membrane bundle and in which discharge ports for discharging the liquid are formed.

24. A method for manufacturing a degasification system comprising:
  preparing a plurality of degasification modules each having a hollow fiber membrane bundle having a plurality of hollow fiber membranes arranged around a liquid supply path through which a liquid is supplied and a module container which houses the hollow fiber membrane bundle and in which discharge ports for discharging the liquid are formed, and a connection supply pipe in which a plurality of openings through which the liquid passes are formed;
  inserting the connection supply pipe into the liquid supply paths of the plurality of degasification modules to connect the liquid supply paths of the plurality of degasification modules in series by the connection supply pipe and disposing the plurality of openings at positions corresponding to the plurality of degasification modules such that the liquid is supplied to the hollow fiber membrane bundles of the plurality of degasification modules in parallel; and
  in a case in which one of the plurality of degasification modules is designated as an upstream side degasification module, and one of the plurality of degasification modules disposed on a downstream side of the upstream side degasification module is designated as a downstream side degasification module, making a pressure loss of the liquid from a supply port of the connection supply pipe through which the liquid is supplied to the discharge ports of the downstream side degasification module larger than a pressure loss of the liquid from the supply port to the discharge ports of the upstream side degasification module.

25. A method for producing natural resources in the degasification system according to claim 1, comprising:
  a degasification step of degasifying a liquid by supplying the liquid from the connection supply pipe to the liquid supply paths of the plurality of degasification modules and depressurizing an inside of the plurality of hollow fiber membranes of each of the plurality of degasification modules; and
  a press-in step of pressing-in the liquid degasified in the degasification step into a natural resource mining site.

* * * * *